United States Patent
Lee et al.

(10) Patent No.: US 12,230,819 B2
(45) Date of Patent: Feb. 18, 2025

(54) BATTERY MODULE AND BATTERY PACK INCLUDING THE SAME

(71) Applicant: LG Energy Solution, Ltd., Seoul (KR)

(72) Inventors: Hyunjae Lee, Daejeon (KR); Junyeob Seong, Daejeon (KR); Yongjoon Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 625 days.

(21) Appl. No.: 17/606,337

(22) PCT Filed: Jun. 30, 2020

(86) PCT No.: PCT/KR2020/008528
§ 371 (c)(1),
(2) Date: Oct. 25, 2021

(87) PCT Pub. No.: WO2021/071057
PCT Pub. Date: Apr. 15, 2021

(65) Prior Publication Data
US 2022/0158284 A1    May 19, 2022

(30) Foreign Application Priority Data
Oct. 10, 2019  (KR) .................. 10-2019-0125307

(51) Int. Cl.
*H01M 50/204*  (2021.01)
*H01M 10/04*   (2006.01)
(Continued)

(52) U.S. Cl.
CPC ..... *H01M 50/204* (2021.01); *H01M 10/0481* (2013.01); *H01M 10/625* (2015.04); *H01M 10/653* (2015.04); *H01M 50/227* (2021.01); *H01M 50/24* (2021.01); *H01M 50/249* (2021.01); *H01M 50/289* (2021.01); *H01M 2220/20* (2013.01)

(58) Field of Classification Search
None
See application file for complete search history.

(56) References Cited

U.S. PATENT DOCUMENTS 9,236,585 B2 *  1/2016  Nishikawa ........ H01M 10/6555
9,577,284 B2    2/2017  Andreas-Schott et al.
(Continued)

FOREIGN PATENT DOCUMENTS

CN    107251268 A    10/2017
CN    107615564 A    1/2018
(Continued)

OTHER PUBLICATIONS

International Search Report for Application No. PCT/KR2020/008528, dated Oct. 8, 2020, 3 pages.
(Continued)

*Primary Examiner* — Kevin M Bernatz
(74) *Attorney, Agent, or Firm* — Lerner David LLP

(57) ABSTRACT

A battery module according to an embodiment of the present disclosure includes a battery cell stack, in which a plurality of battery cells are stacked, and a wrap film. The wrap film extends continuously around the battery cell stack so as to surround a top surface, a lower surface, and both side surfaces of the battery cell stack.

17 Claims, 5 Drawing Sheets

(51) Int. Cl.
*H01M 10/625* (2014.01)
*H01M 10/653* (2014.01)
*H01M 50/227* (2021.01)
*H01M 50/24* (2021.01)
*H01M 50/249* (2021.01)
*H01M 50/289* (2021.01)

(56) References Cited

U.S. PATENT DOCUMENTS

| | | | |
|---|---|---|---|
| 11,594,776 B2* | 2/2023 | Yoo | H01M 10/625 |
| 2003/0175584 A1* | 9/2003 | Shrim | H01M 50/256 |
| | | | 429/513 |
| 2014/0234691 A1 | 8/2014 | Lee et al. | |
| 2017/0117517 A1* | 4/2017 | Smith | H01M 50/227 |
| 2017/0187082 A1 | 6/2017 | Zhao et al. | |
| 2018/0083286 A1* | 3/2018 | Ise | H01M 4/667 |
| 2018/0083306 A1 | 3/2018 | Melack et al. | |
| 2018/0175464 A1 | 6/2018 | Kim et al. | |
| 2018/0175468 A1 | 6/2018 | Shin et al. | |
| 2018/0183117 A1* | 6/2018 | Cho | H01M 50/24 |
| 2018/0191020 A1 | 7/2018 | Melack et al. | |
| 2018/0287184 A1 | 10/2018 | Lee et al. | |
| 2019/0131596 A1 | 5/2019 | Yang et al. | |
| 2020/0106058 A1 | 4/2020 | Kim | |
| 2020/0274213 A1 | 8/2020 | Cho et al. | |
| 2020/0343499 A1* | 10/2020 | Yoo | H01M 10/655 |
| 2020/0381694 A1* | 12/2020 | Rath | H01M 50/505 |
| 2020/0388805 A1* | 12/2020 | Yoo | H01M 10/6567 |
| 2020/0388814 A1 | 12/2020 | Jang et al. | |
| 2021/0013460 A1* | 1/2021 | Ootsuki | B32B 27/285 |
| 2021/0313637 A1* | 10/2021 | Yamashiro | H01M 10/6555 |
| 2021/0328291 A1* | 10/2021 | Nishikawa | H01M 10/0525 |
| 2021/0344074 A1* | 11/2021 | Jung | H01M 50/593 |
| 2022/0037715 A1* | 2/2022 | Kim | H01M 50/24 |
| 2022/0149478 A1* | 5/2022 | Egashira | H01M 50/271 |
| 2022/0247004 A1 | 8/2022 | Yun | |
| 2022/0328905 A1* | 10/2022 | Park | H01M 50/271 |
| 2022/0407139 A1* | 12/2022 | Kim | H01M 10/653 |
| 2022/0416344 A1* | 12/2022 | Jeon | H01M 50/229 |
| 2023/0238608 A1* | 7/2023 | Kim | H01M 10/613 |
| | | | 429/120 |
| 2023/0249017 A1* | 8/2023 | Kim | A62C 3/16 |
| | | | 429/120 |
| 2023/0402703 A1* | 12/2023 | Kim | H01M 50/358 |

FOREIGN PATENT DOCUMENTS

| | | |
|---|---|---|
| CN | 207868255 U | 9/2018 |
| DE | 102018203150 A1 | 9/2019 |
| EP | 2763214 A1 | 8/2014 |
| JP | S59096764 U | 6/1984 |
| JP | H02014666 U | 1/1990 |
| JP | H11086813 A | 3/1999 |
| JP | 2000090976 A | 3/2000 |
| JP | 2001130626 A | 5/2001 |
| JP | 2002-100411 A | 4/2002 |
| JP | 2003142055 A | 5/2003 |
| JP | 2004014139 A | 1/2004 |
| JP | 2004319342 A | 11/2004 |
| JP | 2005108693 A | 4/2005 |
| JP | 2014063569 A | 4/2014 |
| JP | 2017504149 A | 2/2017 |
| JP | 2018521486 A | 8/2018 |
| JP | 2018522373 A | 8/2018 |
| KR | 20140050182 A | 4/2014 |
| KR | 20170139302 A | 12/2017 |
| KR | 101900998 B1 | 9/2018 |
| KR | 20190063809 A | 6/2019 |
| KR | 20190105731 A | 9/2019 |
| WO | 2018227423 A1 | 12/2018 |
| WO | 2019177275 A1 | 9/2019 |
| WO | 2019190072 A1 | 10/2019 |

OTHER PUBLICATIONS

Partial Supplementary European Search Report for Application No. 20874852.5 dated May 31, 2022. 15 pgs.
Extended European Search Report for Application No. 20874852.5 dated Aug. 30, 2022. 13 pgs.
Search Report dated Feb. 16, 2023 from the Office Action for Chinese Application No. 202080028513.7 issued Feb. 18, 2023, 3 pages. [See p. 1-2, categorizing the cited references].

* cited by examiner

[FIG. 1]
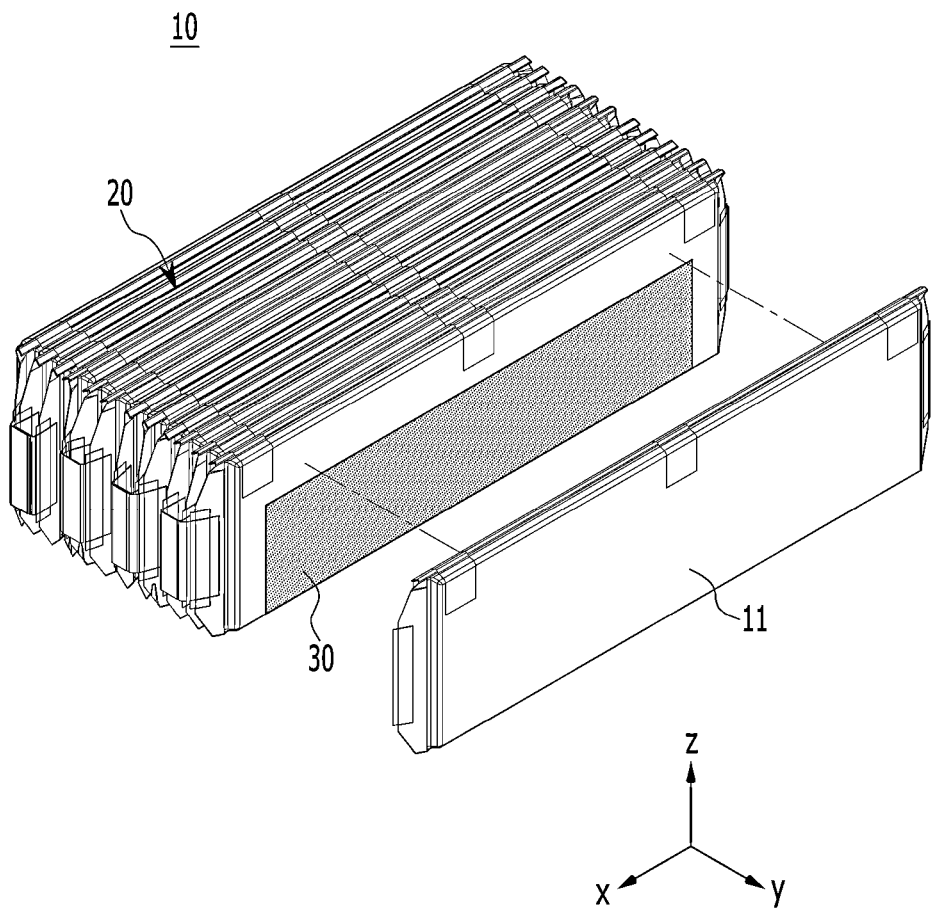
Prior Art

[FIG. 2]
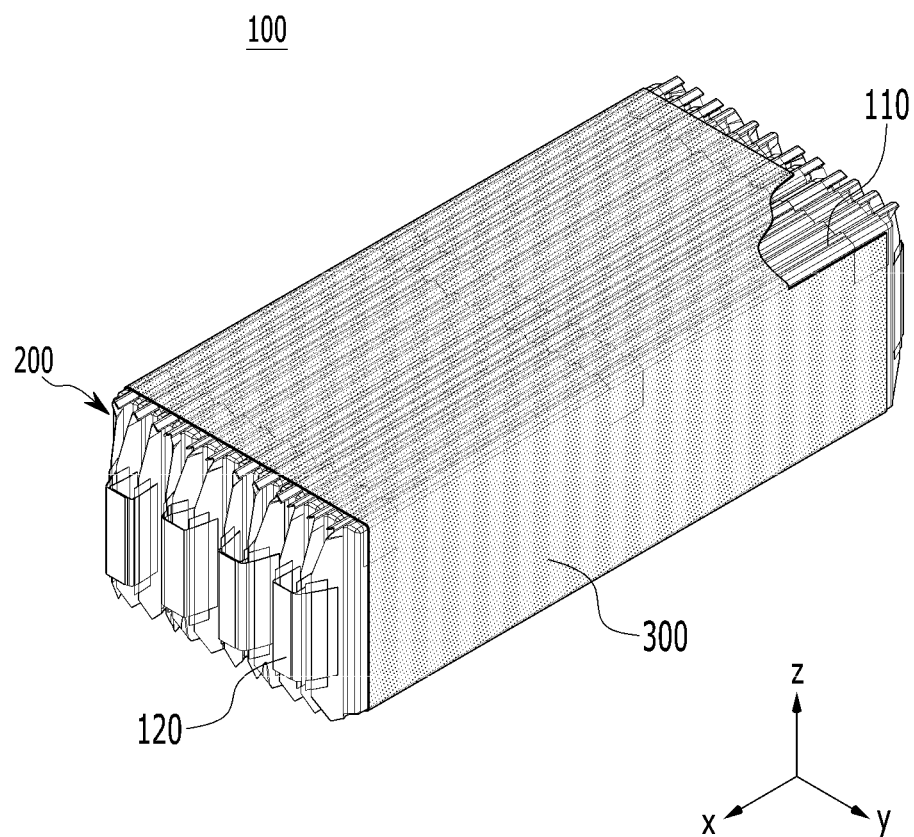

[FIG. 3]
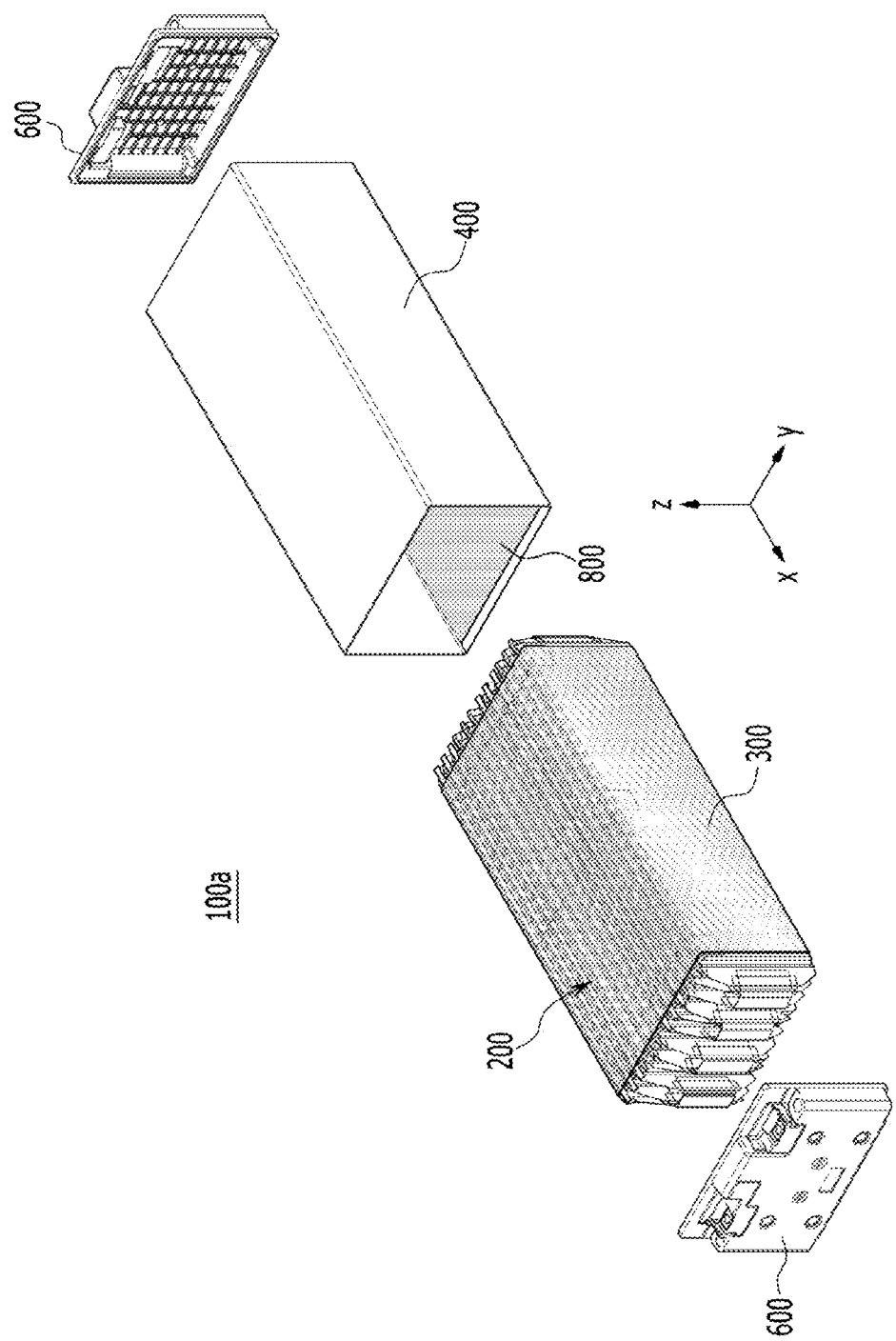

[FIG. 4]
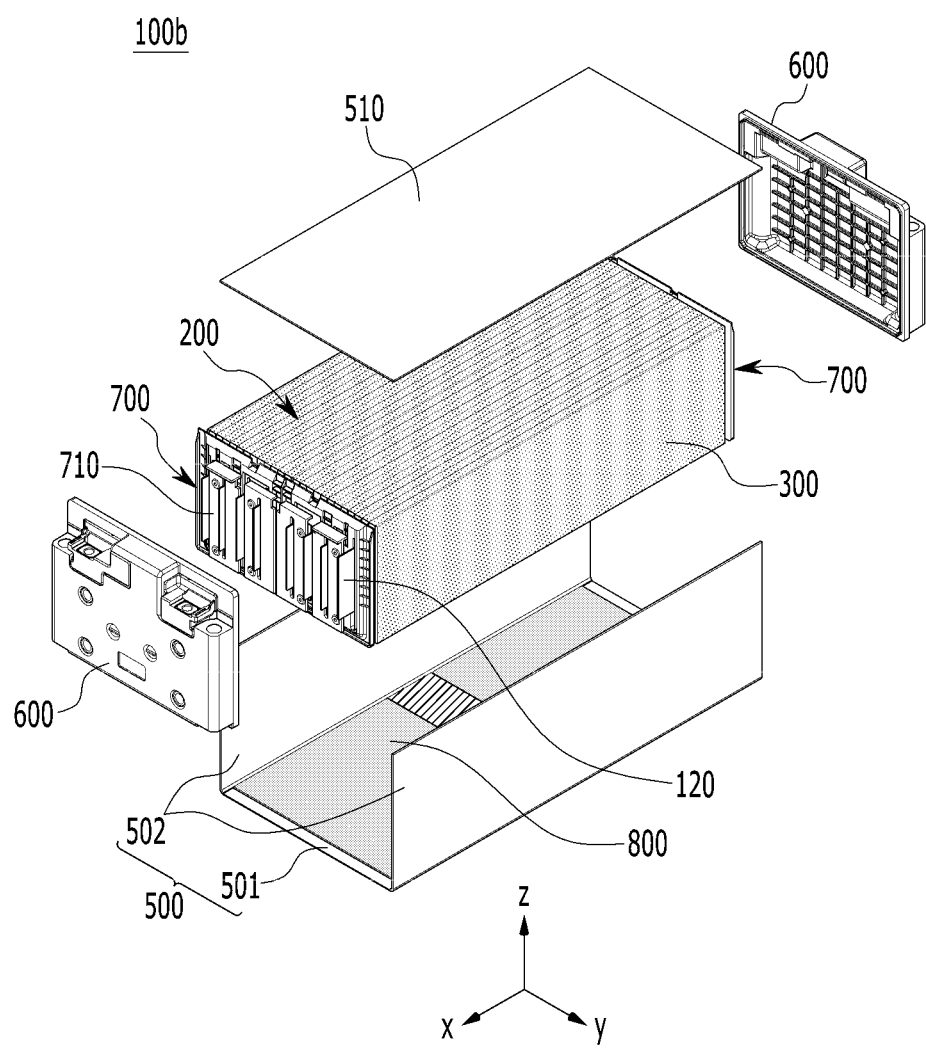

【FIG. 5】
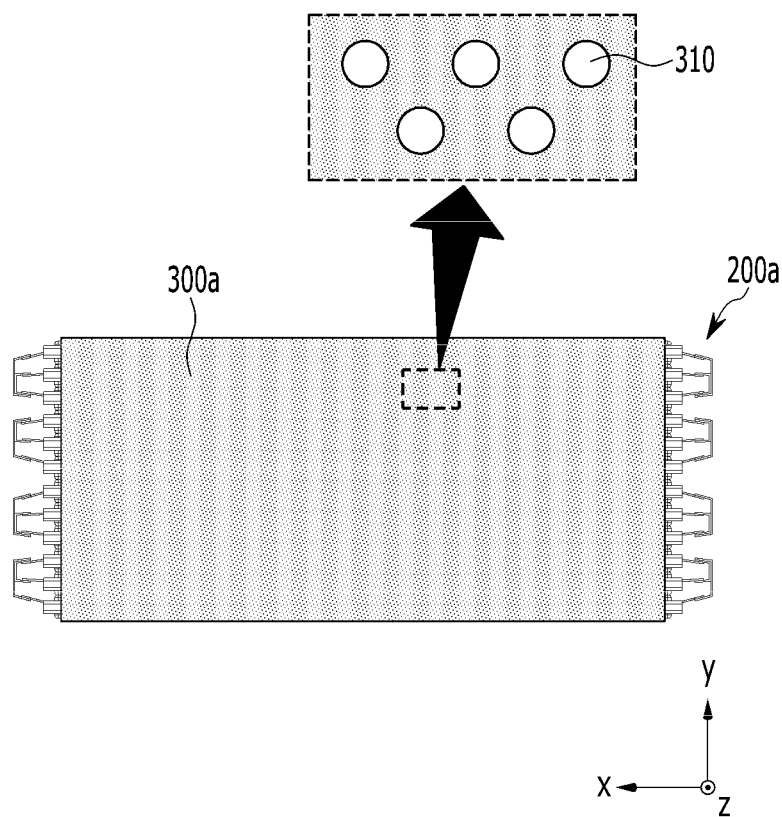

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2020/008528 filed on Jun. 30, 2020, which claims priority from Korean Patent Application No. 10-2019-0125307 filed on Oct. 10, 2019, the disclosure of which is incorporated herein by reference in its entirety

TECHNICAL FIELD

The present disclosure relates to a battery module and a battery pack including the same, and more particularly to a battery module in which a method of fixing a plurality of battery cells is improved, and a battery pack including the same.

BACKGROUND ART

Secondary batteries, which are easily applied to various product groups and have electrical characteristics such as high energy density, are universally applied not only for a portable device but also for an electric vehicle or a hybrid electric vehicle, an energy storage system or the like, which is driven by an electric driving source. Such secondary batteries are attracting attention as a new environmentally-friendly energy source for improving energy efficiency since they provide a primary advantage of remarkably reducing the use of fossil fuels and also do not generate by-products from the use of energy at all.

Currently commercialized secondary batteries include nickel cadmium batteries, nickel hydrogen batteries, nickel zinc batteries, and lithium secondary batteries. Among them, lithium secondary batteries have come into the spotlight because they have advantages, for example, hardly exhibiting memory effects compared to nickel-based secondary batteries and thus being freely charged and discharged, and having very low self-discharge rate and high energy density.

Such lithium secondary batteries mainly use a lithium-based oxide and a carbonaceous material as a positive electrode active material and a negative electrode active material, respectively. A lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly together with an electrolyte.

Generally, lithium secondary batteries may be classified based on the shape of the exterior material into a can type secondary battery in which the electrode assembly is embedded in a metal can, and a pouch-type secondary battery in which the electrode assembly is embedded in a pouch of an aluminum laminate sheet.

Small-sized mobile devices use one to three battery cells for each device, whereas middle- or large-sized devices such as vehicles require high power and large capacity. Therefore, a middle- or large-sized battery module having a plurality of battery cells electrically connected to one another is used.

The middle- or large-sized battery module is preferably manufactured so as to have as small a size and weight as possible. Consequently, a prismatic battery or a pouch-shaped battery, which can be stacked with high integration and has a small weight relative to capacity, is usually used as a battery cell of the middle- or large-sized battery module.

Meanwhile, in order to protect the cell stack from external shock, heat, or vibration, the battery module may include a module frame member which accommodates the battery cell stack in an internal space.

FIG. 1 is a perspective view illustrating a battery module 10 according to the related art. However, for explaining a fixing method for battery cells, illustration of a module frame is omitted.

Referring to FIG. 1, the battery module 10 according to the related art includes a battery cell stack 20, in which the plurality of battery cells 11 are stacked.

As the battery cells 11 are stacked along the Y-axis direction, an adhesive 30 such as a double-sided tape is disposed between battery cells 11, thereby fixing the battery cells 11 constituting the battery cell stack 20. Moreover, although not illustrated in detail, a compression pad may be further disposed in the battery cells 11 located on the outermost side thereof, and the adhesive may also be located between the compression pad and the battery cell 11.

However, as the number of battery cells 11 constituting the battery cell stack 20 increases, the number of adhesives 30, which has to be disposed therebetween increases, and accordingly the number of repeated processes increases. That is, in order to implement the battery modules with high output and large capacity, the plurality of battery cells 11 are required, but there is a problem in that the fixing method through the conventional adhesive 30 requires unnecessarily repetitive processes.

Further, when a deviation occurs or a tolerance condition is not satisfied in a process of stacking the battery cells 11, reworking the stacking is necessary but the conventional fixing method using the adhesive 30 has a problem in that it is extremely difficult to perform reworking.

Therefore, in order to simplify process procedures and make it easier to rework the stacking, it is necessary to improve the method of fixing the battery cells constituting the battery cell stack.

DETAILED DESCRIPTION OF THE INVENTION

Technical Problem

Embodiments of the present disclosure have been made in an effort to solve the above-mentioned problems, and an object thereof is to improve a method of fixing battery cells constituting a battery cell stack.

However, the problem to be solved by the embodiments of the present disclosure is not limited to the above-described problems, and can be variously expanded within the scope of the technical idea included in the present disclosure.

Technical Solution

A battery module according to an embodiment of the present disclosure includes a battery cell stack, in which a plurality of battery cells are stacked, and a wrap film surrounding a top surface, a lower surface, and both side surfaces of the battery cell stack, wherein the wrap film is continuously connected to the top surface, the lower surface and the both side surfaces of the battery cell stack.

An adhesive or a tape between the respective battery cells is eliminated and the adjacent battery cells may make direct contact with each other.

The wrap film may surround all of the top surface, the lower surface and the both side surfaces of the battery cell stack.

The wrap film may include at least one of polycarbonate (PC), and polyethylene terephthalate (PET).

The battery cells may be stacked to be disposed in parallel to the both side surfaces of the battery cell stack.

The battery cells may include electrode leads, and the electrode leads may be located on a front surface and a rear surface of the battery cell stack.

The wrap film may surround the battery cell stack once to twice.

The battery module may further include a module frame configured to accommodate the battery cell stack and an end plate configured to cover a front surface and a rear surface of the module frame.

The module frame may be a mono frame, in which the front surface and the rear surface thereof are opened, and a top surface, a lower surface, and both side surfaces thereof are integrated.

The module frame may include a U-shaped frame, in which a front surface, a rear surface, and a top surface thereof are opened, and a top cover configured to cover the opened top surface of the U-shaped frame.

A plurality of through-holes may be formed in the wrap film.

The plurality of through-holes may be formed in the wrap film located at a lower end of the battery cell stack.

The battery module may further include a thermally conductive resin layer located under the battery cell stack.

The thermally conductive resin layer may include at least one of a silicone material, a urethane material, and an acrylic material.

Advantageous Effects

According to the embodiments of the present disclosure, the battery cells may be easily fixed through the wrap film structure that surrounds the battery cell stack, even if the number of battery cells constituting the battery cell stack increases.

Also, even if a deviation occurs or the tolerance condition is not satisfied during a stacking process, the reworking of the stacking may be easily performed Further, since the electrical insulation between the battery cell stack and the module frame is possible by the wrap film, the insertion of other members for insulation is unnecessary.

In addition, the change in appearance of the battery module can be minimized by restraining the expansion of the battery cell stack due to the swelling phenomenon of the battery cells, thereby improving the structural safety of the battery module and the battery pack including the same.

BRIEF DESCRIPTION OF THE DRAWINGS

FIG. 1 is a perspective view illustrating a battery module according to the related art, in which illustration of a module frame is omitted.

FIG. 2 is a perspective view illustrating a battery module according to an embodiment of the present disclosure, in which illustration of a module frame is omitted.

FIG. 3 is an exploded perspective view illustrating a battery module including a mono frame;

FIG. 4 is an exploded perspective view illustrating a battery module including a U-shaped frame; and FIG. 5 is a view illustrating a battery cell stack viewed from the lower side to illustrate a wrap film, in which through-holes are formed.

DETAILED DESCRIPTION OF THE EMBODIMENTS

Hereinafter, various embodiments of the present disclosure will be described in detail with reference to the accompanying figures so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 2 is a perspective view illustrating a battery module 100 according to an embodiment of the present disclosure, in which illustration of a module frame is omitted.

Referring to FIG. 2, a battery module 100 according to an embodiment of the present disclosure includes a battery cell stack 200, in which a plurality of battery cells 110 are stacked, and a wrap film 300 surrounding a top surface (Z-axis direction), a lower surface (the opposite direction of Z-axis direction), and both side surfaces (Y-axis direction and the opposite direction thereof) of the battery cell stack 200.

Further, the wrap film 300 is continuously connected to the top surface (Z-axis direction), the lower surface (the opposite direction of Z-axis direction), and both side surfaces (Y-axis direction and the opposite direction thereof) of the battery cell stack 200.

In the conventional battery module 10 in FIG. 1, an adhesive 30 is located between a plurality of battery cells 11 to fix the battery cells 11. Accordingly, as the number of battery cells 11 increases, the number of adhesives 30 that has to be disposed therebetween increases. Each time the respective battery cells 11 are stacked, it is necessary to repeat the processes of applying the adhesive 30 and attaching the battery cell 11. That is, there was a problem in that repeated processes result in excessive time and cost.

Thus, a battery module 100 according to the present embodiment, includes an outer circumferential surface of the battery cell stack 200, that is, a wrap film 300 surrounding a top surface, a lower surface, and both side surfaces, thereby being able to fix the battery cells 110. Thereby, the adhesive or a tape are unnecessary and thus removed between the respective battery cells 110, and the adjacent battery cells 110 may make direct contact with each other.

The outer circumferential surface of the battery cell stack 200 may be surrounded by a wrap film 300 without the necessity of interposing the adhesive between the respective battery cells 110, even if the number of battery cells 110 increases, so that a conventional repetitive process is not required, thereby saving time and cost.

Further, even if a deviation occurs or a tolerance condition is not satisfied during a process of stacking the battery cells 110, the surrounded wrap film 300 is removed and then the battery cells 110 are stacked again and surrounded by a new wrap film 300, which make the rework easier. The present embodiment has a great advantage in that for a conventional battery cell stack 20, in which the respective battery cells 11 have already been bonded, the rework process is extremely difficult.

Meanwhile, it is preferable that the wrap film 300 of the present embodiment surrounds all of a top surface (Z-axis direction), a lower surface (opposite direction of Z-axis direction), and both side surfaces (Y-axis direction and opposite direction thereof) of the battery cell stack 200 as illustrated in FIG. 2.

Accordingly, the battery cells 110 constituting the battery cell stack 200 may be effectively fixed, and further an electrical insulation between the battery cell stack 200 and a module frame (not shown) may be performed.

The module frame, in which the battery cell stack 200 are accommodated, generally includes a metal material for a rigidity, so that it is required to be electrically insulated from the battery cell stack 200.

Accordingly, the wrap film 300 surrounding all of the top surface (Z-axis direction), the lower surface (the opposite direction of Z-axis direction), and both side surfaces (Y-axis direction and the opposite direction thereof) of the battery cell stack 200, may act as an electrical insulation of the battery cell stack 200 as well as fixing the battery cells 110. Accordingly, there is no need to dispose a separate additional member to secure an insulation performance.

Here, the wrap film 300 may include at least one of polycarbonate (PC) and polyethylene terephthalate (PET) to fix the battery cells 110 and to be electrically insulated from the battery cell stack 200. That is, the wrap film 300 has a thin sheet structure, which includes at least one of polycarbonate (PC) and polyethylene terephthalate (PET), thereby implementing the fixation of the battery cells 110 and the electrical insulation of the battery cell stack 200.

Meanwhile, the battery cells 110 of the present embodiment are disposed and stacked in parallel to both side surfaces of the battery cell stack 200. That is, they are stacked along the Y-axis direction in FIG. 2.

Here, the battery cell 110 may be configured of a pouch type secondary battery, and the pouch type secondary battery is configured such that an electrode becomes thicker while being repeatedly charged and discharged, or an internal electrolyte is decomposed due to a side reaction to generate gas. Here, a phenomenon, in which the pouch type secondary battery swells due to the expansion of electrodes and/or the generated gas, is called a swelling phenomenon. When the swelling phenomenon of battery cells 110 intensifies, it can change an appearance of the battery module 100 and adversely affect the structural stability of the battery module 100 or a battery pack including the same.

The wrap film 300, which tightly surrounds the top surface, the lower surface, and both side surfaces of the battery cell stack 200 such that the wrap film 300 is connected, can effectively restrain the expansion of the battery cell stack 200 resulting from the swelling phenomenon of the battery cells 110 as well as fixing the battery cells 110.

In particular, as it is known that expansion of the thickness due to swelling is relatively smaller when the stacked battery cells 110 are strongly pressed from the beginning of assembly, the wrap film 300 can be more effective in restraining expansion.

Meanwhile, the wrap film 300 of the present embodiment may surround the battery cell stack 200 once to twice. When being surrounded less than once, the battery cells 110 may not be smoothly fixed, and when being surrounded more than twice, the height or width of the battery cell stack 200 may become thicker due to there being more wrap film 300 than necessary, which causes the problem that the battery capacity is reduced.

Referring to FIG. 2 again, the battery cells 110 may include electrode leads 120 connected to an electrode assembly (not shown), and the electrode leads 120 may be located at a front surface (X-axis direction) and a rear surface (the opposite direction of X-axis direction) of the battery cell stack 200.

In the embodiments of the present disclosure, the battery cell stack is embedded in a module frame, and the module frame may be a mono frame or a U-shaped frame. FIGS. 3 and 4 are views for explaining a mono frame and a U-shaped frame, respectively. Hereinafter, it will be described with reference to FIG. 3 and FIG. 4.

FIG. 3 is an exploded perspective view illustrating a battery module 100a including a mono frame 400. Referring to FIG. 3, a battery module 100a of the present disclosure may include a mono frame 400, in which the battery cell stack 200 is accommodated.

The mono frame may have a metal plate structure, in which a front surface (X-axis direction) and a rear surface (the opposite direction of X-axis direction) thereof are open, and a top surface (Z-axis direction), a lower surface (the opposite direction of Z-axis direction), and both side surfaces (Y-axis direction and the opposite direction thereof) thereof are integrated. End plates 600 may be coupled to the open front surface and rear surface of the mono frame 400.

The battery cell stack 200 may be inserted into the open front surface or rear surface of the mono frame 400, and the wrap film 300 surrounding the battery cell stack 200 may function as a guide member in the insertion process. That is, the top surface, the lower surface, and both side surfaces of the battery cell stack 200 may be surrounded by the wrap film 300 to prevent jamming during the insertion process, and thus the battery cell stack 200 may be easily inserted into the open front surface or rear surface of the mono frame 400.

Further, compression pads (not shown) may be disposed on both side surfaces of the battery cell stack 200, and the wrap film 300 may prevent the compression pads from being rolled up during the insertion of the battery cell stack 200.

FIG. 4 is an exploded perspective view illustrating a battery module 100b including a U-shaped frame 500.

Referring to FIG. 4, the U-shaped frame 500 may have a structure, in which a front surface (X-axis direction), a rear surface (the opposite direction of X-axis direction), and a top surface (Z-axis direction) are open, and a bottom part 501 and both side surface parts 502 extending upwards from both ends of the bottom part 501 and facing each other are provided.

A top cover 510 may be coupled to the open top surface of the U-shaped frame 500, and end plates 600 may be coupled to the open front surface and rear surface of the U-shaped frame 500, respectively.

Electrode leads 120 may be located at the front surface and the rear surface of the battery cell stack 200, and the electrode leads 120 may be electrically connected to busbars 710 mounted in busbar frames 700.

The battery cell stack 200 may be inserted into the open top surface of the U-shaped frame 500, and the wrap film 300 surrounding the battery cell stack 200 may function as a guide member in the insertion process. That is, both side surfaces of the battery cell stack 200 may be surrounded by the wrap film 300 to prevent a hooking phenomenon or the like by both side surface parts 502 during the insertion process, so that the battery cell stack 200 may be easily inserted therein.

Further, compression pads (not shown) may be disposed on both side surfaces of the battery cell stack 200, and the wrap film 300 may prevent the compression pads from being rolled up by both side surface parts 502 during the insertion process of the battery cell stack 200.

Referring back to FIG. 3, the battery module 100a may include a thermally conductive resin layer 800 located under the battery cell stack 200. In more detail, the thermally conductive resin layer 800 may be located between the battery cell stack 200 and a bottom part of the mono frame 400.

The thermally conductive resin layer 800 is formed by injecting a thermally conductive resin, and may contain a thermally conductive bonding material and, in detail, may be formed such that the thermally conductive resin is injected in a fluid state and then solidified while making contact with the battery cell stack 200. That is, the thermally conductive resin layer 800 may function to transfer heat generated from the battery cell stack 200 to the bottom of the battery module 100a.

Although not illustrated in detail, after the battery cell stack 200 is accommodated in the mono frame 400, the thermally conductive resin is injected through an injection hole disposed at a lower portion of the mono frame 400 to form the thermally conductive resin layer 800.

Referring back to FIG. 4, the battery module 100b may include a thermally conductive resin layer 800 located under the battery cell stack 200. In more detail, the thermally conductive resin layer 800 may be located between the battery cell stack 200 and the bottom part 501 of the U-shaped frame 500.

Similarly to FIG. 3, the thermally conductive resin layer 800, in which the thermally conductive resin is applied, may function to transfer heat generated from the battery cell stack 200 to the bottom of the battery module 100b.

After the thermally conductive resin is applied to the bottom part 501 of the U-shaped frame 500, and the battery cell stack 200 is disposed thereon, the thermally conductive resin may be solidified to form a thermally conductive resin layer 800.

Meanwhile, the thermally conductive resin of the thermally conductive resin layer 800 may include a thermally conductive bonding material, and in detail, it may include at least one of a silicone material, a urethane material, and an acrylic material. The thermally conductive resin layer 800 may rapidly transfer heat generated from the battery cells due to excellent thermal conductivity characteristics to prevent overheating of the battery modules 100a and 100b.

Here, FIG. 5 is a view describing a wrap film 300a, in which through-holes 310 are formed, and is a view illustrating a battery cell stack 200a viewed from the lower side.

Referring to FIG. 5 together with FIGS. 3 and 4, the plurality of through-holes 310 may be formed in the wrap film 300a of the present disclosure.

In particular, the plurality of through-holes 310 may be formed in the wrap film 300a located at the lower end of the battery cell stack 200a.

Further, the through-holes 310 may be formed in all areas of the wrap film 300a as well as the lower end of the battery cell stack 200a.

As described above, in order to transfer heat generated from the battery cell stack 200a, the thermally conductive resin layer 800 may be located between the battery cell stack 200a and the bottom parts of the module frames 400 and 500.

The through-holes 310 formed in the wrap film 300a may allow the plurality of battery cells included in the battery cell stack 200a to make direct contact with the thermally conductive resin layer 800, and thus heat transfer of the battery cell stack 200a may be effectively performed via the thermally conductive resin layer 800.

The above-mentioned one or more battery modules according to the present embodiment may be mounted together with various control and protection systems such as a battery management system (BMS) and a cooling system to form a battery pack.

The battery module or the battery pack can be applied to various devices. These devices may be applied to vehicles such as an electric bicycle, an electric vehicle, a hybrid vehicle, but the present disclosure is not limited thereto and can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

Description of Reference Numerals

100: battery module
110: battery cell
200: battery cell stack
300: wrap film
400: mono frame
500: U-shaped frame
510: top cover
600: end plate

The invention claimed is:
1. A battery module comprising:
a battery cell stack, in which a plurality of battery cells are stacked; and
a wrap film extending continuously around the battery cell stack so as to surround a top surface, a lower surface, and both opposing side surfaces of the battery cell stack, wherein the wrap film includes a plurality of through-holes defined therethrough such that each of the plurality of through-holes is completely circumscribed by the wrap film.

2. The battery module of claim 1, wherein adjacent battery cells of the plurality of battery cells in the battery cell stack make direct contact with each other without an adhesive or a tape therebetween.

3. The battery module of claim 1, wherein the wrap film completely surrounds all of the top surface, the lower surface and both of the opposing side surfaces of the battery cell stack.

4. The battery module of claim 1, wherein the wrap film comprises at least one of polycarbonate (PC), and polyethylene terephthalate (PET).

5. The battery module of claim 1, wherein the battery cells are stacked so as to be arranged parallel to both of the opposing side surfaces of the battery cell stack.

6. The battery module of claim 1, wherein each of the battery cells comprise electrode leads, and wherein the electrode leads are positioned at both a front surface and a rear surface of the battery cell stack.

7. The battery module of claim 1, wherein the wrap film extends around the battery cell stack from one to two times.

8. The battery module of claim 1, further comprising:
a module frame configured to receive the battery cell stack therein; and
end plates configured to cover a front surface and a rear surface, respectively, of the module frame.

9. The battery module of claim 8, wherein the module frame is a mono frame, in which the front surface and the rear surface thereof are open, and a top surface, a lower surface, and both side surfaces thereof are integrated into a unitary component.

10. The battery module of claim 8, wherein the module frame comprises a U-shaped frame, in which a front surface, a rear surface, and a top surface thereof are open, the battery module further comprising a top cover configured to cover the open top surface of the U-shaped frame.

11. The battery module of claim 1, wherein the plurality of through-holes are located in a portion of the wrap film positioned along the lower surface of the battery cell stack.

12. The battery module of claim 1, further comprising:
a thermally conductive resin layer positioned under the lower surface of the battery cell stack.

13. The battery pack-module of claim 12, wherein the thermally conductive resin layer comprises at least one of a silicone material, a urethane material, and an acrylic material.

14. A battery pack comprising one or more battery modules of claim 1.

15. The battery module of claim 1, wherein the plurality of through-holes are located on the lower end of the battery cell stack.

16. The battery module of claim 1, wherein the plurality of through-holes are formed in all area of the wrap film.

17. The battery module of claim 1, wherein the plurality of through-holes extend across the width of the wrap film.

* * * * *